United States Patent
Beran

(10) Patent No.: US 11,533,237 B2
(45) Date of Patent: Dec. 20, 2022

(54) ROUND-TRIP ESTIMATION

(71) Applicant: Axis AB, Lund (SE)

(72) Inventor: Jaroslav Beran, Prague (CZ)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/215,022

(22) Filed: Mar. 29, 2021

(65) Prior Publication Data

US 2021/0351985 A1    Nov. 11, 2021

(30) Foreign Application Priority Data

May 5, 2020 (EP) .................................... 20172847

(51) Int. Cl.
*H04L 12/26* (2006.01)
*H04L 41/0896* (2022.01)
*H04L 43/08* (2022.01)
*H04L 65/65* (2022.01)

(52) U.S. Cl.
CPC .......... *H04L 41/0896* (2013.01); *H04L 43/08* (2013.01); *H04L 65/65* (2022.05)

(58) Field of Classification Search
CPC ... H04L 41/0896; H04L 43/08; H04L 65/608; H04L 47/193; H04L 47/2416; H04L 47/31; H04L 43/0864; H04L 47/29; H04L 47/283; H04L 1/0002; H04L 43/0888; H04L 47/25; H04L 65/80; H04N 21/2662
See application file for complete search history.

(56) References Cited

U.S. PATENT DOCUMENTS

| | | | |
|---|---|---|---|
| 9,197,559 B1 * | 11/2015 | Cloonan | H04L 12/6418 |
| 10,165,286 B2 * | 12/2018 | Sze | H04N 21/6131 |
| 10,187,680 B2 * | 1/2019 | Oran | H04N 21/23406 |
| 2004/0148423 A1 | 7/2004 | Key et al. | |
| 2004/0233844 A1 * | 11/2004 | Yu | H04L 12/5602 370/395.21 |
| 2006/0129693 A1 | 6/2006 | LeCroy et al. | |

(Continued)

OTHER PUBLICATIONS

Extended European Search Report dated Oct. 2, 2020 for European Patent Application No. 20172847.4.

(Continued)

*Primary Examiner* — Umar Cheema
*Assistant Examiner* — Tesfu N Mekonen
(74) *Attorney, Agent, or Firm* — Volpe Koenig

(57) ABSTRACT

A networking arrangement is comprises a first network device for transmitting a data stream to a second network device over a network, the method comprises: transmitting a series of first packets to the second network device, each of the first packets having an transmission time and comprising a unique identification value, receiving, from the second network device, a second packet, the second packet indicating receipt of a least one of the first packets by the second network device, determining a standard round-trip time and determining a current round-trip time in dependence on a transmission time of an oldest first packet for which no indication of receipt has been received, and a receipt time of a most recently received second packet, determining an unused network bandwidth between the first network device and the second network device in dependence on the current round-trip time and standard round-trip time.

9 Claims, 8 Drawing Sheets

(56) References Cited

U.S. PATENT DOCUMENTS

| | | |
|---|---|---|
| 2006/0233116 A1* | 10/2006 | Kyusojin ............... H04L 69/28 370/252 |
| 2008/0212480 A1 | 9/2008 | Shimonishi |
| 2009/0097483 A1 | 4/2009 | Henocq et al. |
| 2017/0325129 A1* | 11/2017 | Zhu ....................... H04W 28/20 |
| 2017/0366650 A1* | 12/2017 | Zhu ....................... H04L 69/16 |
| 2019/0089643 A1 | 3/2019 | Westphal et al. |
| 2019/0191005 A1* | 6/2019 | Gallardo ............... H04L 67/32 |
| 2019/0320146 A1 | 10/2019 | Irani et al. |

OTHER PUBLICATIONS

Communication pursuant to Article 94(3) EPC dated Feb. 8, 2021 for European Patent Application No. 20172847.4.

Friedman T et al: "RTP Extended Reports (RTP XR)", Internet Citation, Jan. 24, 2003 (Jan. 24, 2003), XP002249991, Retrieved from the Internet: URL:http://www.watersprings.org/pub/id/draft-ietf-avt-rtcp-reportextns-02.txt [retrieved on Jul. 31, 2003].

A. Boukerche, R. W. N. Pazzi and F. Kazem, "Design and Implementation of a Rate Control Mechanism for Image-based Virtual Exploration over Wireless Networks," Proceedings. 2006 31st IEEE Conference on Local Computer Networks, Tampa, FL, USA, pp. 905-912, (2006).

\* cited by examiner

|  |  | Sent Packets | Received RTCP Packets | | | | | |
|---|---|---|---|---|---|---|---|---|
| Time [s] | Packet Type | RTP packet sequence number | RTCP Sender Report NTP timestamp (middle 32 bits) | Highest sequence number received in an RTP packet | Last Sender Report timestamp | Delay since last Sender Report [ms] | RTT [ms] | CRTT [ms] |
| 15,608353 | RTCP (V) |  | 521052487 |  |  |  |  |  |
| 15,618036 | RTP (A) | 46693 |  |  |  |  |  |  |
| 15,690529 | RTP (V) | 42259 |  |  |  |  |  |  |
| 15,735777 | RTP (V) | 42267 |  |  |  |  |  |  |
| 15,778621 | RTP (A) | 46701 |  |  |  |  |  |  |
| 15,779239 | RTCP (A) |  | 521063759 |  |  |  |  |  |
| 15,798162 | RTP (A) | 46702 |  |  |  |  |  |  |
| 15,817981 | RTP (A) | 46703 |  |  |  |  |  |  |
| 15,838025 | RTP (A) | 46704 |  |  |  |  |  |  |
| 15,839468 | RTP (V) | 42268 |  |  |  |  |  |  |
| 15,83977 | RTP (V) | 42269 |  |  |  |  |  |  |
| 15,878306 | RTP (V) | 42273 |  |  |  |  |  |  |
| 15,958488 | RTP (A) | 46710 |  |  |  |  |  |  |
| 15,968897 | RTCP (V) |  |  | 42268 | 521052487 | 359 | 1,54 | 129 |
| 15,978151 | RTP (A) | 46711 |  |  |  |  |  |  |
| 15,998138 | RTP (A) | 46712 |  |  |  |  |  |  |
| 15,999977 | RTP (V) | 42274 |  |  |  |  |  |  |
| 16,118077 | RTP (A) | 46718 |  |  |  |  |  |  |
| 16,13486 | RTP (V) | 42283 |  |  |  |  |  |  |
| 16,135336 | RTP (V) | 42284 |  |  |  |  |  |  |
| 16,135678 | RTP (V) | 42285 |  |  |  |  |  |  |
| 16,136001 | RTP (V) | 42286 |  |  |  |  |  |  |
| 16,136329 | RTP (V) | 42287 |  |  |  |  |  |  |
| 16,137985 | RTP (A) | 46719 |  |  |  |  |  |  |
| 16,158436 | RTP (A) | 46720 |  |  |  |  |  |  |
| 16,171621 | RTCP (A) |  |  | 46712 | 521063759 | 231 | 161,38 | 173 |
| 16,178193 | RTP (A) | 46721 |  |  |  |  |  |  |
| 16,358071 | RTP (A) | 46730 |  |  |  |  |  |  |
| 16,35884 | RTP (V) | 42297 |  |  |  |  |  |  |
| 16,378368 | RTP (A) | 46731 |  |  |  |  |  |  |
| 16,398214 | RTP (A) | 46732 |  |  |  |  |  |  |
| 16,418272 | RTP (A) | 46733 |  |  |  |  |  |  |
| 16,43566 | RTCP (V) |  |  | 42285 | 521052487 | 826 | 1,31 | 300 |
| 16,438387 | RTP (A) | 46734 |  |  |  |  |  |  |
| 16,458032 | RTP (A) | 46735 |  |  |  |  |  |  |
| 16,467428 | RTCP (A) |  |  | 46718 | 521063759 | 526 | 162,19 | 349,351 |

Setting video stream bitrate to 164648

Figure 5

ROUND-TRIP ESTIMATION

TECHNICAL FIELD

The embodiments described relate to usage optimisation of available network bandwidth between two network connected devices. In particular, some of the embodiments described relate to the improved determination of round-trip times for network communication and to corresponding media stream configuration changes to account for the round-trip times.

BACKGROUND

Real-time Transport Protocol (RTP) is a networking protocol for delivering media, such as audio and video, over Internet Protocol (IP) networks. RTP is commonly used in communication, entertainment, and surveillance systems that involve streaming media, such as telephony, video teleconference, and network camera applications.

The RTP typically runs over User Datagram Protocol (UDP). UDP uses a simple connectionless communication model and does not provide packet acknowledgement. Therefore, there is no error correction or monitoring at the protocol layer, unlike Transmission Control Protocol (TCP) or equivalent alternative protocols.

A problem with the RTP, e.g. when used for transmitting audio and video data during video calls, is that it does not address resource reservation and does not guarantee quality-of-service for real-time services. For example, the audio and video quality can be affected by network congestion. In order to address the lack of error correction or monitoring, RTP may be used in conjunction with an RTP Control Protocol (RTCP). While the RTP carries the media streams (e.g. audio streams and video streams), RTCP is used to monitor transmission statistics and quality of service (QoS) and aids synchronization of multiple streams. This is accomplished using feedback on the quality of service (QoS) in media distribution by periodically sending statistics information such as packet counts, packet loss, packet delay variation, and round-trip delay time to participants in a streaming multimedia session.

FIG. 1 shows an example of a round-trip delay time calculation according to RTCP. Each member of a networked session, e.g. a sender device 20 and a receiver device 30, periodically sends RTCP sender/receiver reports. A round-trip time (RTT) can be calculated using timestamps transmitted in the RTCP reports. i.e.

1) The sender device sends a first RTP or RTCP packet to the receiver device.
2) The receiver device sends a corresponding second RTCP report back to the receiver device acknowledging the first RTP or RTCP packet.
3) The sender device calculates a round-trip based on the time stamps of the first and second RTCP report.

As the RTT is a good indicator of network congestion, e.g. a queueing delay, it can be used to determine suitable bit rates for transmission of the media streams. However, RTCP reports may or may not be transmitted periodically. They can be transmitted according to a regular schedule or they can be sent when needed, for example when requested. Either way, if network latency suddenly increases, there can be a delay before the necessary RTCP reports have been exchanged between the sender device and the receiver device before the increased network latency can be detected. Under these circumstances, the quality of the transmitted audio and video stream can be impaired.

What is needed is a way of monitoring and updating network latency without waiting until the next set of RTCP reports are exchanged between the sender and receiver devices.

SUMMARY

A first aspect of the disclosure is a method performed by a first network device, the first network device being configured to transmit a data stream to a second network device over a network at a bit rate, the method comprising: transmitting a series of first packets to the second network device over the network, each of the first packets having an associated transmission time and comprising a unique identification value, receiving, from the second network device, a second packet, the second packet indicating receipt of a least one of the first packets by the second network device, the second packet having an associated receipt time, determining a standard round-trip time in dependence on at least: a transmission time of a first packet for which an indication of receipt has been received, and a receipt time of a second packet that comprises an indication receipt of the first packet, determining a current round-trip time in dependence on: a transmission time of an oldest first packet for which no indication of receipt has been received, and a receipt time of a most recently received second packet, determining whether an unused network bandwidth between the first network device and the second network device exists in dependence on the current round-trip time and standard round-trip time, updating the bit rate for the transmitted data stream in dependence on the determined unused network. An advantage of this embodiment is the speed at which first network device can respond to the changes in available bandwidth between the first network device and second network device. By assessing both standard round-trip time and current round-trip time, the first network device can respond to a change in network bandwidth more quickly than with standard round-trip time alone. For example, in situations involving low latency, live streaming video, such as live sport, where huge pre-buffers are undesirable for the latency they introduce, it is critical that the networked system is able to respond as quickly as possible to changes in the availability of unused network bandwidth.

Optionally, the step of determining the current round-trip time further comprises determining the current round-trip time to be a time difference between the transmission time of an oldest first packet for which no indication of receipt has been received, and the receipt time of a most recently received second packet. This allows the use of a more recent first packet than the first packets used by techniques typically employed by standard round-trip time. This difference allows a 'fresher' assessment of the round-trip time using more recently transmitted packets.

Optionally, the standard round-trip time is determined in dependence on a transmission time value of a first packet, a receipt time of the first packet at the second network device, the transmission time value of a second packet that comprises an indication receipt of the first packet, and a receipt time of the second packet at the first network device.

Optionally, the second packet comprises a Real-time Transport Control Protocol (RTCP) packet and wherein the series of first packets comprise one or more Real-time Transport Protocol (RTP) packets and at least one RTCP packet. Existing RTP assessment techniques are limited and the use of the described methods in combination with RTCP allows the advantages of RTP to be employed with fewer of the disadvantages.

Optionally, the step of determining whether an unused network bandwidth between the first network device and the second network device exists comprises determining that that the standard round-trip time exceeds a first threshold and/or that the current round-trip time exceeds a second threshold. Optionally, the second threshold is greater than the first threshold. The use of multiple thresholds allows a more complex programmatic response to changing network bandwidth availability.

Optionally, the step of updating the bit rate for the transmitted data stream in dependence on the existence of the unused network bandwidth comprises decreasing the bit rate for the data stream when the unused network bandwidth does not exist. This advantageously allows the data stream to avoid disruption when available network bandwidth is decreased.

Optionally, the step of updating the bit rate for the transmitted data stream in dependence on the existence of the unused network bandwidth comprises increasing the bit rate for the data stream when the unused network bandwidth exists. This advantageously allows the data stream to improve media quality when available network bandwidth is increased.

Optionally, the step of updating the bit rate for the transmitted data stream in dependence on the existence of the unused network bandwidth comprises decreasing the bit rate of the data stream when the standard round-trip time and/or the current round-trip time is increased. This advantageously allows the data stream to avoid disruption when network buffering is occurring.

Optionally, the data stream comprises at least one of a video stream and audio stream. Updating the bit rate for the transmitted data stream may comprise updating at least one of a target bit rate, average bit rate, resolution, colour depth, frame rate, sampling frequency, bit depth, and channel count. Allowing the adjustment of these configuration options advantageously allows a response to network disruption that is optimised for the media viewer's experience.

Optionally, the above method further comprises determining a used network bandwidth between the first network device and the second network device based on a total size of data packets transmitted between the first network device and the second network device per second; determining a network throughput value in dependence on the used network bandwidth, the network throughput value being an amount of data the first network device is able to deliver to the second network device per second; determining a total size of data packets buffered in the network based on a total size of data packets transmitted by the first network device and on a total size of data packets delivered to the second network device; determining a reserved bandwidth required to deliver data packets buffered in the network to the second network device within a time interval reasonable to empty buffers in the network; determining a remaining bandwidth for the data stream based on the network throughput value and the reserved bandwidth, and possibly based on a bandwidth used by an additional data stream; and updating the bit rate for the data stream in dependence of the determined remaining bandwidth for the data stream. This advantageously allows a more balanced optimisation of the data stream in dependence on the used network bandwidth. This allows a decrease of the standard round-trip time and/or current round-trip time within a reasonable time interval by emptying the buffers.

A second aspect of the disclosure is a first network device configured to transmit a data stream to a second network device over a network at a bit rate, the first network device being configured to: transmit first packets to the second network device over the network, each of the first packets having an associated transmission time and comprising a unique identification value, receive, from the second network device, a second packet, the second packet indicating receipt of a last one of the first packets by the second network device, each of the second packets having an associated receipt time, determine a standard round-trip time in dependence on at least: a transmission time of a first packet for which an indication of receipt has been received, and a receipt time of a second packet that comprises an indication receipt of the first packet, determine a current round-trip time in dependence on: a transmission time of an oldest first packet for which no indication of receipt has been received, and a receipt time of a most recently received second packet, determine whether an unused network bandwidth between the first network device and the second network device exists in dependence on the standard round-trip time and current round-trip time, update the bit rate for the transmitted data stream in dependence on the existence of the unused network bandwidth.

BRIEF DESCRIPTION OF THE DRAWINGS

Other features and advantages of the will become apparent from the following detailed description of an example, with reference to the accompanying drawings, in which.

DESCRIPTION

Figure 1:
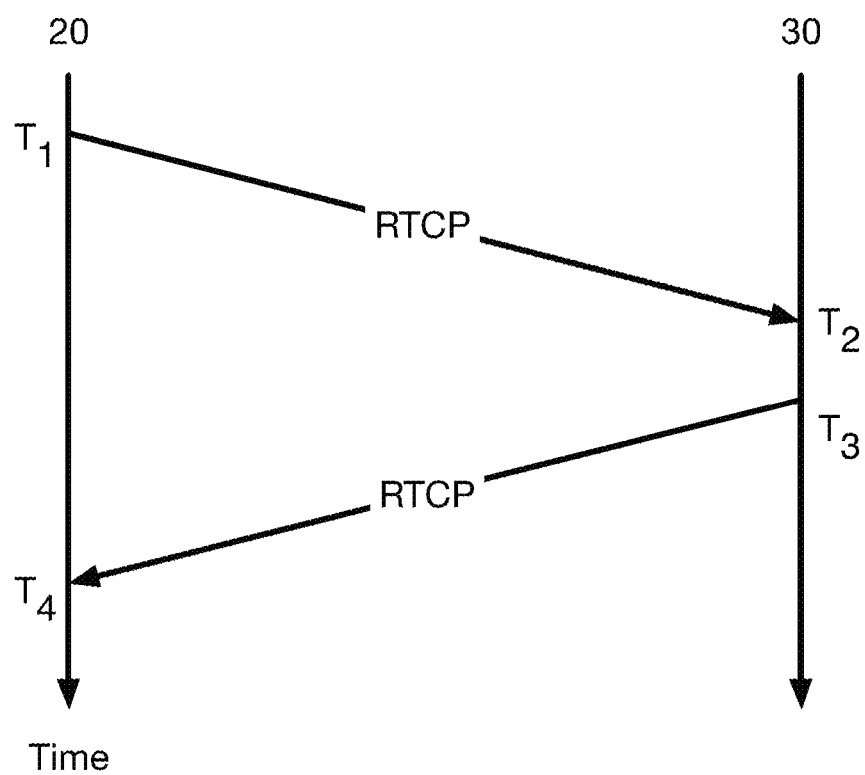
FIG. 1 is sequence diagram showing a standard round-trip determination according to RTCP.

The present description relates to apparatuses and techniques for usage optimisation of available network bandwidth between two network connected devices. Throughout the description, the same reference numerals are used to identify corresponding elements.

Figure 2:
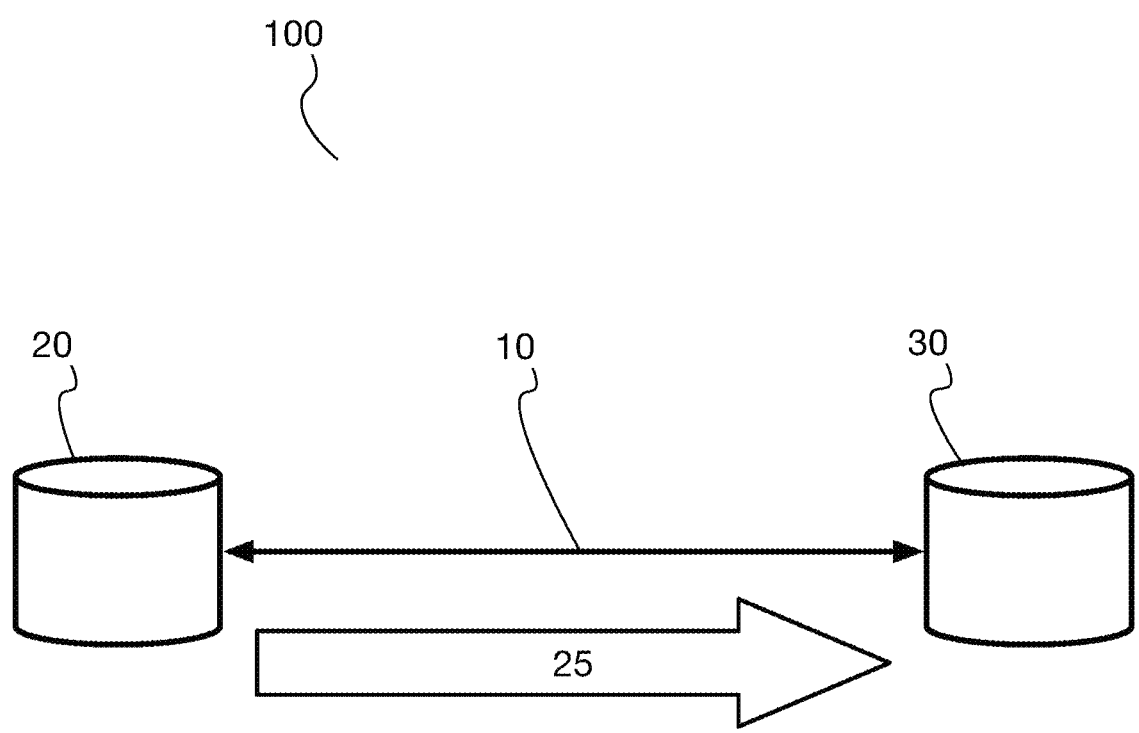
FIG. 2 is a network system according to an aspect of the description.

FIG. 2 is a diagram of a networked system 100 comprising first network device 20 connected to second network device 30 by network 10. In one embodiment, the network 10 is an ethernet network using Internet Protocol (IP) for the network layer, User Datagram Protocol (UDP) as the transport layer, and Real-time Transport Protocol (RTP) at the application layer. However, other protocol stacks can be envisaged where the same or substantially equivalent techniques may be applied. In FIG. 2, first network device 20 is configured to transmit a data stream 25 to the second network device 30 by network 10.

In one embodiment, the data stream 25 is a media stream comprising a video stream and/or an audio stream. The media stream comprises a continuous video or audio content that is converted by first network device 20 from a first media format into the media stream. This conversion is known as media encoding and may be performed by a device or computer program known as a codec. The conversion process carried out by the codec may be performed using a number of configuration options that affect the resulting media stream. These options include the bit rate used to encode the media. Bit rate options may include employment of a target bit rate, an average bit rate. Other codec options may include the choice of video resolution, video colour depth, video frame rate, audio sampling frequency, audio bit depth, audio channel count, the choice of encoding algorithm, etc. In one embodiment, the configuration used to encode the media may be changed at any time during the streaming, so as to allow dynamic changes to the properties of the streaming media. This provides the significant advantage of allowing the streaming media to be adapted to the network environment it is being transmitted over. Although the present disclosure will now focus on adaptations of the bit rate configurations of the streamed media in response to the network environment, it is understood that any of the codec configurations options may be adjusted in response to a changing network environment to enable better usage of the available network bandwidth.

After being encoded and transmitted across network 10, the data stream 25 is then received by the second network device 30 and decoded and played to a user at the second network device 30 or at a device connected to second network device 30. Alternatively, the media stream received by second network device 30 may be stored by second network device 30 or by a device connected to second network device 30.

Figure 3:
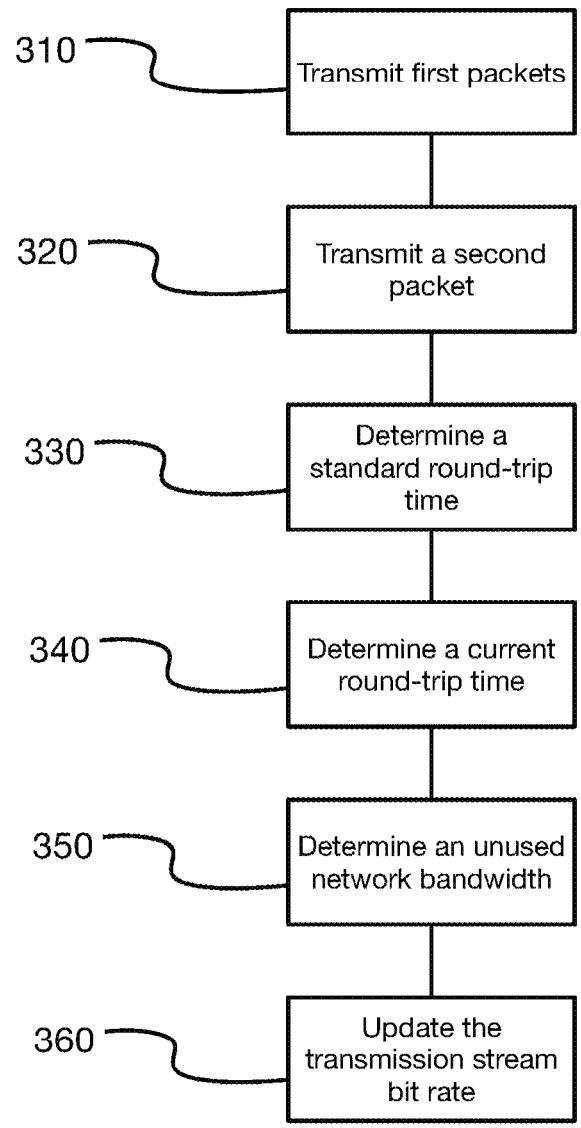
FIG. 3 is a flowchart for a technique for determining an increased network latency and responding to the increased network latency accordingly according to an aspect of the description.
Figure 4:
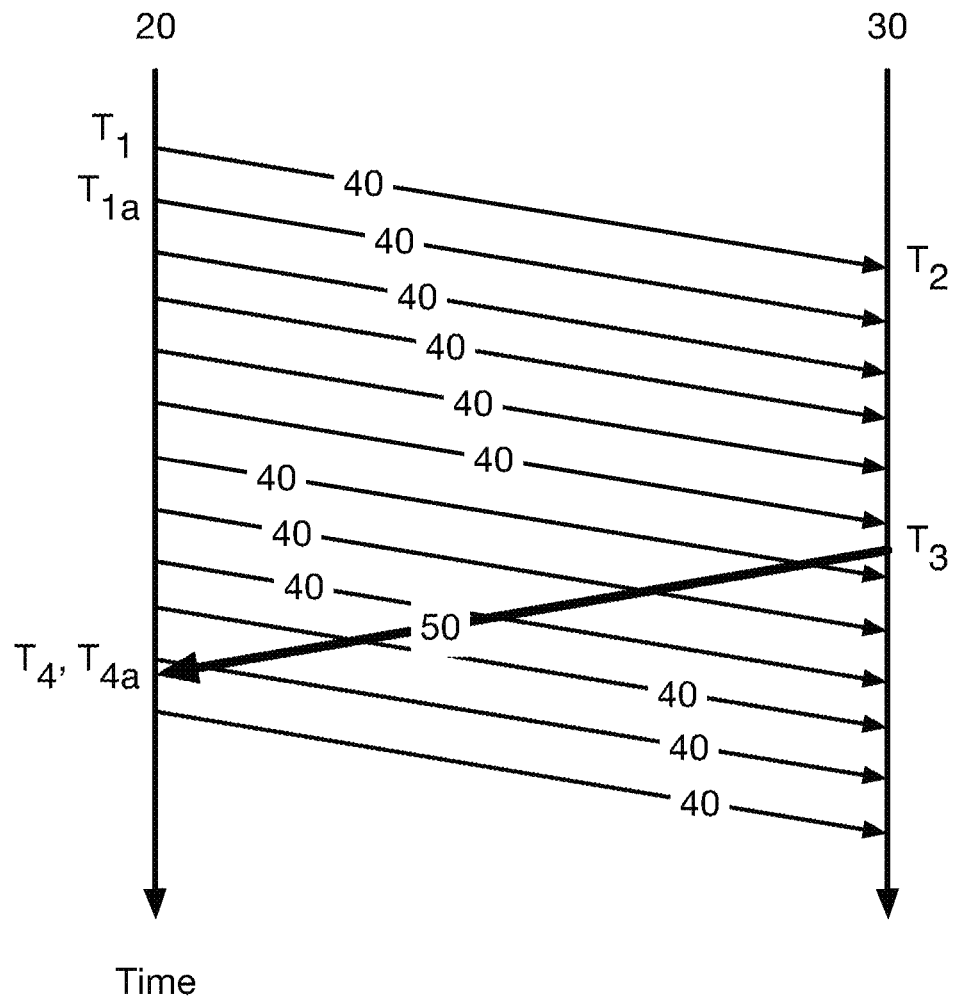
FIG. 4 is a sequence diagram for packets used for an CRTT according to an aspect of the description, FIG. 5 provides a table with packet transmission and acknowledgement data.

FIG. 3 shows an embodiment of the disclosure for rapidly determining an increased network latency and responding to the increased network latency accordingly. FIG. 3 will be described below with reference to FIG. 4 showing a sequence diagram for packets used for an CRTT according to an aspect of the description.

In step 310, a series of first packets 40 are transmitted by the first network device 20 to the second network device 30 over the network 10. The first packets 40 may comprise the data forming the streaming media. In one embodiment, the first packets 40 comprise RTP packets and at least one RTCP packet. Each of the first packets 40 comprise a unique identification value 60 capable of uniquely identifying the first packet 40. The unique identification value 60 is shown as the 'RTP packet sequence number' in the embodiment shown in FIG. 5.

In one embodiment, first network device 20 records the unique identification value 60 and time of transmission $T_1$ of each of the first packets 40.

In step 320, second network device 30 transmits a second packet 50 to the first network device 20. The second packet 50 may be a Real-time Transport Control Protocol (RTCP) packet. In one embodiment, the second packet 50 comprises an indication of receipt of a first packet 40 by the second network device 30. This may comprise the unique identification value 60 of the corresponding first packet 40. The second packet 50 may further comprise a time of receipt $T_2$ of the first packet 40 at the second network device 30. The second packet 50 may further comprise a time of transmission $T_3$ of the second packet 50 from the second network device 30. In an alternative embodiment, instead of time of receipt $T_2$ and time of transmission $T_3$, the second packet 50 comprises a 'processing time' which records the time between time of receipt $T_2$ and time of transmission $T_3$, i.e. ($T_3-T_2$). In one embodiment, first network device 20 records the time of receipt $T_4$ of each of the second packets 50.

In step 330, the first network device 20 determines a standard round-trip time (RTT) using at least one first packet 40 and:
  the time of transmission $T_1$ of the first packet 40
  the time of receipt $T_4$ of a second packet 50 which contained an indication of receipt corresponding to the first packet 40, and
  the time of receipt $T_2$ of the first packet 40 at second network device 30 subtracted from the time of transmission $T_3$ of the second packet 50 from the second network device 30, i.e. ($T_3-T_2$).

The RTT may then be calculated as $T_4-(T_3-T_2)-T_1$. In an example shown in the sequence diagram of FIG. 4 and the packet table of FIG. 5, a first packet 40 was transmitted at time 15.608353 seconds ($T_1$) according to a clock on the first network device 20. Then a second packet 50 was transmitted from the second network device 30 and received at time 16.43566 seconds ($T_4$) according to a clock on the first network device 20. The second packet 50 comprises the processing time ($T_3-T_2$), also known as the Delay Since Last Sender Report Packet (DLSR). The DLSR in this example is 0.826 seconds. The round-trip time is then determined by subtracting the delay between the second network device 30 receiving the first packet 40 and transmitting the second packet 50, is 0.001307 seconds, or 1.307 milliseconds≈1.31 milliseconds as stated in FIG. 5.

In step 340, an alternative method is also used to estimate the round-trip time. In step 340 a current round-trip time is determined in dependence on a transmission time ($T_1$) of a first packet 40 for which no indication of receipt has been received, and in dependence on a receipt time ($T_{4a}$) of the most recently received second packet 50. The steps of this alternative method are shown in FIG. 6.

Figure 6:
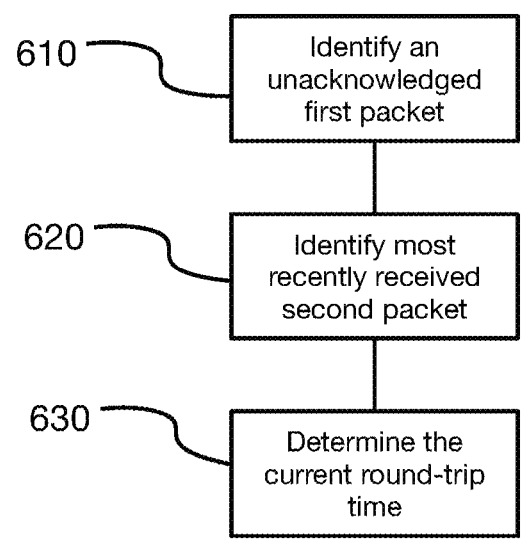
FIG. 6 is a flowchart of a technique for determining a bit rate of a transmitted media stream according to an aspect of the description.

In step 610 of FIG. 6, the first network device 20 identifies a first packet 40 having a transmission time ($T_{1a}$), for which no indication of receipt has yet been received from second network device 30.

In step 620, the first network device 20 identifies a time of receipt ($T_{4a}$) of the most recently received second packet 50 (regardless of its contents).

In step 630, the first network device 20 determines the current round-trip time (CRTT) to be a time difference between the transmission time ($T_{1a}$) of the oldest first packet 40 for which no indication of receipt has been received, and the time of receipt ($T_{4a}$) of the most recently received second packet 50. In an example, also shown in FIG. 6, where a first packet 40 was transmitted at time 16.136001 seconds ($T_{1a}$) and a second packet 50 was received at time 16.43566 seconds ($T_{4a}$) according to a clock on the first network device 20, the round-trip time, is 0.299659 seconds, or 300 milliseconds.

Instead of relying upon just the RTT calculated using the most recently received second packet 50 (e.g. RTCP reports) or waiting for the next RTT to be calculated when next second packet 50 arrives, the above techniques compare the transmission time of the oldest unacknowledged data packet (i.e. an ordinary RTP packet, not an RTCP report) and the receipt time of the latest received RTCP report to provide another useful determination of the latency of the network 10. This does not require using a stale RTT calculated using an older first packet 40 and corresponding second packet 50 and can be calculated using data packets transmitted more recently than those used for the RTT.

In at least one situation, detecting whether an unused network bandwidth exists can be especially advantageous. For example, in situations involving low latency, live streaming video, such as live sport, where huge pre-buffers are undesirable for the latency they introduce, it is critical that the networked system 100 is able to respond as quickly as possible to changes in the availability of unused network bandwidth 90.

Figure 7:
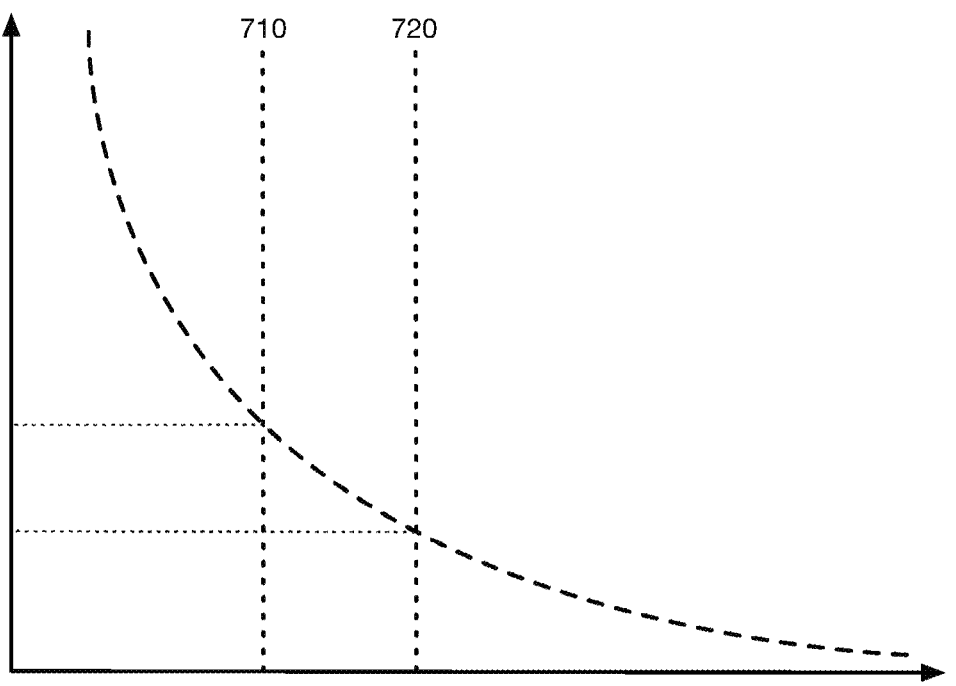
FIG. 7 is a diagram showing a set of round-trip time thresholds and corresponding bandwidth availability.

As shown in FIG. 7, optionally, the step of determining an existence (i.e. availability) of unused network bandwidth 90 comprises determining that the standard RTT exceeds a first threshold 710 and/or that the CRTT exceeds a second threshold 720. Where the first threshold 710 and/or second threshold 720 are exceeded, it is determined that no unused network bandwidth 90 exists or is available. Optionally, the second threshold 720 is greater than the first threshold 710. In one embodiment, a suitable first threshold 710 value is 200 milliseconds. In one embodiment, a suitable second threshold 720 value is 300 milliseconds. Suitable threshold values can be selected in dependence on system design and testing.

Returning to FIG. 3, in step 350, first network device 20 determines the existence or non-existence of unused network bandwidth 90 between the first network device (20) and the second network device (30) in dependence on both the CRTT and the standard RTT. Where the first threshold 710 and/or second threshold 720 are exceeded, it is determined that no unused network bandwidth 90 exists or is available. Where neither the first threshold 710 nor the second threshold 720 are exceeded, it is determined that there may be unused network bandwidth 90.

In step 360, first network device 20 may be configured to alter the codec configuration to update the bit rate for the transmitted data stream 25 in dependence on the determined unused network bandwidth 90.

Optionally, the step of updating the bit rate for the transmitted data stream 25 in view of the determined availability of unused network bandwidth 90 comprises decreasing the bit rate for the data stream 25 when the unused network bandwidth 90 is not available. That the unused network bandwidth 90 is not available could also be stated as the unused network bandwidth 90 is insufficient for the transmission of the data stream at a certain bit rate and thus that the bit rate for the data stream has to be decreased in order to enable the transmission. In other words, an available network bandwidth for transmission of the data stream at the certain bit rate is insufficient, and therefore, the bit rate has to be decreased in order to enable the transmission of the data stream. That unused network bandwidth 90 is available (or 'exists') means that the amount of available unused network bandwidth is sufficient for transmitting the data stream at a higher bit rate and therefore the bit rate of the data stream is increased. In one embodiment, the bit rate for the transmitted data stream 25 is decreased when the standard round-trip time and/or the current round-trip time is increased. For example, this may be the case when the standard round-trip time and/or the current round-trip time is increased even if unused network bandwidth 90 is still available. The reason for decreasing the bit rate is to avoid or reduce delays and congestions over the network.

In one embodiment, the bit rate for only the video stream and not for the audio stream is adjusted in response to changes in network latency. This has the advantage that a recipient may not detect a reduced bit rate of the video stream while he/she may be more sensitive to a reduced bit rate in the audio stream, causing a deteriorated experience of the streamed media.

Figure 8:
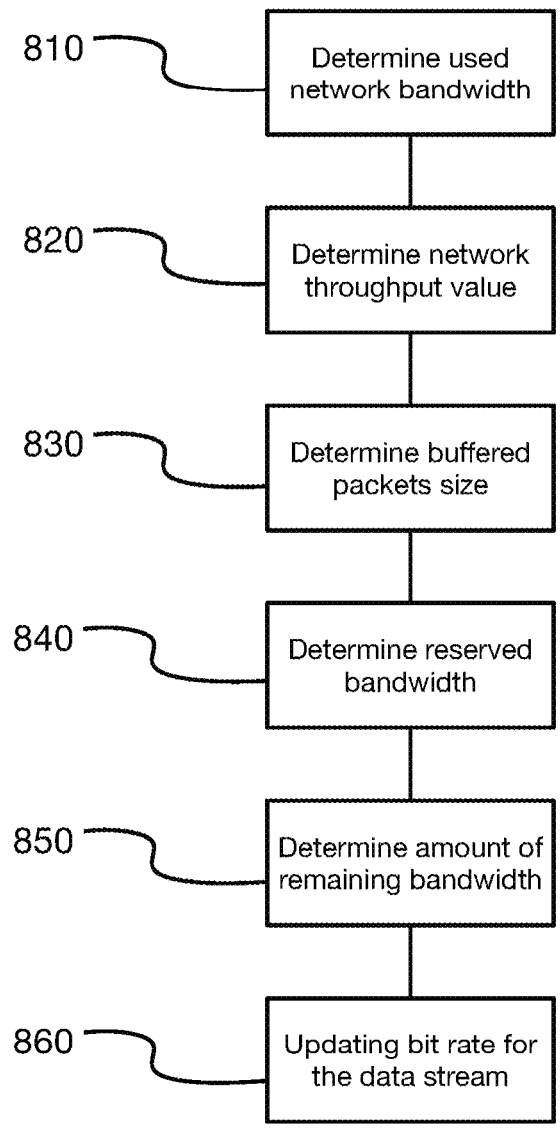
FIG. 8 is a flowchart of a method of selecting a suitable bit rate to reduce buffering of media stream packets on the network.

In an embodiment shown in FIG. 8, a method is provided for selecting a suitable bit rate for encoding of the data stream 25 that will allow the system 100 to reduce a buffering of the first packets 40 on network 10.

In step 810 of FIG. 8, a used network bandwidth 95 between the first network device 20 and the second network device 30 is determined. The used network bandwidth 95 may be determined based on a total size of data packets transmitted between the first network device 20 and the second network device 30 per second. Alternatively, the use of other methods of determining a used network bandwidth 95 over a network 10 known in the art may be envisaged.

In step 820, a network throughput value 96 is determined in dependence on the used network bandwidth 95. The network throughput value 96 corresponds to an amount of data that the first network device 20 is able to deliver to the second network device 30 per second. This value may be known in advance, e.g. as part of a theoretical network bandwidth, or it may be periodically determined. The use of methods for determining a network throughput value 96 of a network 10 known in the art may be envisaged.

In step 830, a total size of the first packets 40 buffered in the network 10 is determined based on a total size of data packets transmitted by the first network device 20 and on a total size of data packets delivered to the second network device 30. The total size of the first packets 40 may be determined as a function of the total number of the first packets 40, the average size of the first packets 40, and/or the amount of data transmitted using the first packets 40.

In step 840, an amount of reserved bandwidth 97 is determined that will enable the delivery of the first packets 40 buffered in the network 10 to the second network device 30 within a time interval reasonable to empty buffers in the network 10.

In step 850, an amount of remaining bandwidth 98 is determined for the data stream 25 based on at least the network throughput value 96 and the reserved bandwidth 97. In one embodiment, the remaining bandwidth 98 is determined for the data stream 25 based on the network throughput value 96, the reserved bandwidth 97, and the bandwidth used by an additional data stream 26.

In step 860, the bit rate for the data stream 25 is updated in dependence of the determined remaining bandwidth 98 for the data stream 25.

In one embodiment, the CRTT determined in steps 610-630 can be used independently of RTT to determine unused network bandwidth 90 and to determine suitable media streaming bit rates over network 10. In this embodiment, the CRTT may be used alone or in combination with other methods of determining unused network bandwidth 90 known in the art.

The invention claimed is:

1. A method performed by a first network device, the first network device being configured to transmit a data stream to a second network device over a network at a bit rate, the method comprising:

transmitting a series of first packets to the second network device over the network, each of the first packets having an associated transmission time and comprising a unique identification value, wherein the series of first packets comprises a first Real-time Transport Control Protocol, RTCP, packet and one or more Real-time Transport Protocol, RTP, packets, and wherein the unique identification value of each of the one or more RTP packets is a sequence number, receiving, from the second network device, a second packet, the second packet indicating receipt of at least one of the first RTCP packet of the series of first packets by the second network device, the second packet having a receipt time $T_4$ at the first network device, wherein the second packet is a second RTCP packet further comprising a highest sequence number of an RTP packet of the series of first packets received at the second network device, determining a standard round-trip time in dependence on at least:
  a transmission time $T_1$ of the first RTCP packet of the series of first packets, and
  a receipt time $T_2$ of the first RTCP packet of the series of first packets at the second network device,
  the transmission time $T_3$ of the second RTCP packet from the second network device, and
  the receipt time $T_4$ of the second RTCP packet, and calculated as $T_4-(T_3-T_2)-T_1$, identify that for a first packet having a transmission time $T_{1a}>T_1$ no indication of receipt has been received at T4 in the second RTCP packet,
  during a period after the receipt time T4 of the second RTCP packet until before receipt of a next second RTCP packet:
    determining a current round-trip time in dependence on:
      a transmission time $T_{1a}$ of an oldest RTP packet of the series of first packets for which no indication of receipt has been received at the first network device, where $T_1<T_{1a}<T_4$, and
      the receipt time $T_4$ of the second RTCP packet, and wherein the current round-trip time is calculated as $T_4-T_{1a}$, determining whether an unused network bandwidth between the first network device and the second network device exists in dependence on the current round-trip time and standard round-trip time, wherein no unused network bandwidth exists when the standard round-trip time exceeds a first threshold and/or the current round-trip time exceeds a second threshold, and updating the bit rate for the transmitted data stream in dependence on the existence of the unused network bandwidth.

2. The method of claim 1, wherein the second threshold is greater than the first threshold.

3. The method of claim 1, wherein updating the bit rate for the transmitted data stream in dependence on the existence of the unused network bandwidth comprises:
  decreasing the bit rate for the data stream when the unused network bandwidth does not exist.

4. The method of claim 1, wherein updating the bit rate for the transmitted data stream in dependence on the existence of the unused network bandwidth comprises:
  increasing the bit rate for the data stream when the unused network bandwidth exists.

5. The method of claim 1, wherein updating the bit rate for the transmitted data stream in dependence on the existence of the unused network bandwidth comprises:
  decreasing the bit rate of the data stream when the standard round-trip time and/or the current round-trip time is increased.

6. The method of claim 1, wherein the data stream comprises at least one of a video stream and audio stream.

7. The method of claim 6, wherein updating the bit rate for the transmitted data stream comprises updating at least one of a target bit rate, average bit rate, resolution, colour depth, frame rate, sampling frequency, bit depth, and channel count.

8. The method of claim 1, further comprising:
  determining a used network bandwidth between the first network device and the second network device based on a total size of data packets transmitted between the first network device and the second network device per second;
  determining a network throughput value in dependence on the used network bandwidth, the network throughput value being an amount of data the first network device is able to deliver to the second network device per second;
  determining a total size of data packets buffered in the network based on a total size of data packets transmitted by the first network device and on a total size of data packets delivered to the second network device;
  determining a reserved bandwidth required to deliver data packets buffered in the network to the second network device within a time interval reasonable to empty buffers in the network;
  determining a remaining bandwidth for the data stream based on the network throughput value and the reserved bandwidth, and possibly based on a bandwidth used by an additional data stream; and
  updating the bit rate for the data stream in dependence of the determined remaining bandwidth for the data stream.

9. A first network device configured to transmit a data stream to a second network device over a network at a bit rate, the first network device further comprising a processor and a memory and being configured to:
  transmit a series of first packets to the second network device over the network, each of the first packets having an associated transmission time and comprising a unique identification value, wherein the series of first packets comprises a first Real-time Transport Control Protocol, RTCP, packet and one or more Real-time Transport Protocol, RTP, packets, and wherein the unique identification value of each of the one or more RTP packets is a sequence number,
  receive, from the second network device, a second packet, the second packet indicating receipt of a last one of the first RTCP packet of the series of first packets by the second network device, the second packet having a receipt time $T_4$ at the first network device, wherein the second packet is a second RTCP packet further comprising a highest sequence number of an RTP packet of the series of first packets received at the second network device,
  determine a standard round-trip time in dependence on at least:
    a transmission time $T_1$ of the first RTCP packet of the series of first packets, and
    a receipt time $T_2$ of the first RTCP packet of the series of first packets at the second network device,
    the transmission time $T_3$ of the second RTCP packet from the second network device, and
    the receipt time $T_4$ of the second RTCP packet, and calculated as $T_4-(T_3-T_2)-T_1$,
  identify that for a first packet having a transmission time $T_{1a}>T_1$ no indication of receipt has been received at $T_4$ in the second RTCP packet,
    during a period after the receipt time $T_4$ of the second RTCP packet until before receipt of a next second RTCP packet:
      determine a current round-trip time in dependence on:

a transmission time $T_{1a}$ of an oldest RTP packet of the series of first packets for which no indication of receipt has been received at the first network device, where $T_1 < T_{1a} < T_4$, and the receipt time $T_4$ of the second RTCP, and wherein the current round-trip time is calculated as $T_4 - T_{1a}$, determine whether an unused network bandwidth between the first network device and the second network device exists in dependence on the standard round-trip time and current round-trip time, wherein no unused network bandwidth exists when the standard round-trip time exceeds a first threshold and/or the current round-trip time exceeds a second threshold, and update the bit rate for the transmitted data stream in dependence on the existence of the unused network bandwidth.

* * * * *